(12) United States Patent
Kaifuku et al.

(10) Patent No.: US 9,919,700 B2
(45) Date of Patent: Mar. 20, 2018

(54) VEHICLE CONTROL DEVICE

(71) Applicant: AISIN AW CO., LTD., Anjo-shi, Aichi-ken (JP)

(72) Inventors: Masakazu Kaifuku, Anjo (JP); Shiko Yoshimura, Nakatsugawa (JP)

(73) Assignee: AISIN AW CO., LTD., Anjo (JP)

( * ) Notice: Subject to any disclaimer, the term of this patent is extended or adjusted under 35 U.S.C. 154(b) by 78 days.

(21) Appl. No.: 15/108,742

(22) PCT Filed: Feb. 20, 2015

(86) PCT No.: PCT/JP2015/054760
§ 371 (c)(1),
(2) Date: Jun. 28, 2016

(87) PCT Pub. No.: WO2015/129571
PCT Pub. Date: Sep. 3, 2015

(65) Prior Publication Data
US 2016/0318506 A1  Nov. 3, 2016

(30) Foreign Application Priority Data

Feb. 28, 2014 (JP) .................................. 2014-039107

(51) Int. Cl.
*B60W 10/08* (2006.01)
*B60W 20/30* (2016.01)
(Continued)

(52) U.S. Cl.
CPC .............. *B60W 20/30* (2013.01); *B60K 6/44* (2013.01); *B60K 6/52* (2013.01); *B60K 6/547* (2013.01);
(Continued)

(58) Field of Classification Search
CPC .... B60W 20/00; B60W 10/06; B60W 10/115; B60W 2510/0638; B60W 2520/28;
(Continued)

(56) References Cited

U.S. PATENT DOCUMENTS 5,211,079 A * 5/1993 Runde .................. F16H 61/061
477/119
5,890,392 A * 4/1999 Ludanek ............ F16H 61/0403
74/331
(Continued)

FOREIGN PATENT DOCUMENTS

CN 103386970 A 11/2013
JP H08-58436 A 3/1996
(Continued)

OTHER PUBLICATIONS

May 26, 2015 Search Report issued in International Patent Application No. PCT/JP2015/054760.

*Primary Examiner* — Dalena Tran
(74) *Attorney, Agent, or Firm* — Oliff PLC

(57) ABSTRACT

A vehicle control device for controlling a vehicle driving device including an internal combustion engine as a driving force source for a wheel and a transmission apparatus, wherein the transmission apparatus includes a transmission shift input member drivably coupled to the internal combustion engine, a transmission shift output member drivably coupled to the wheel, and a transmission mechanism having a plurality of engagement devices and selectively forming a plurality of transmission shift stages having different transmission shift ratios depending on engagement states of the plurality of engagement devices.

11 Claims, 5 Drawing Sheets

(51) Int. Cl.

| | | |
|---|---|---|
| B60K 6/44 | (2007.10) | |
| B60K 6/52 | (2007.10) | |
| B60K 6/547 | (2007.10) | |
| B60L 11/14 | (2006.01) | |
| B60W 10/04 | (2006.01) | |
| B60W 10/06 | (2006.01) | |
| B60W 10/10 | (2012.01) | |
| B60W 10/11 | (2012.01) | |
| B60W 20/00 | (2016.01) | |
| F16H 61/04 | (2006.01) | |
| B60L 7/14 | (2006.01) | |
| B60L 7/26 | (2006.01) | |
| B60L 11/12 | (2006.01) | |
| B60L 15/20 | (2006.01) | |
| B60W 30/19 | (2012.01) | |

(52) U.S. Cl.
CPC ............ *B60L 7/14* (2013.01); *B60L 7/26* (2013.01); *B60L 11/123* (2013.01); *B60L 11/14* (2013.01); *B60L 15/2009* (2013.01); *B60L 15/2054* (2013.01); *B60W 10/04* (2013.01); *B60W 10/06* (2013.01); *B60W 10/08* (2013.01); *B60W 10/10* (2013.01); *B60W 10/11* (2013.01); *B60W 20/00* (2013.01); *B60W 30/19* (2013.01); *F16H 61/04* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2250/26* (2013.01); *B60L 2260/28* (2013.01); *B60L 2270/145* (2013.01); *Y02T 10/623* (2013.01); *Y02T 10/6217* (2013.01); *Y02T 10/6265* (2013.01); *Y02T 10/6286* (2013.01); *Y02T 10/645* (2013.01); *Y02T 10/7077* (2013.01); *Y02T 10/7241* (2013.01); *Y02T 10/7275* (2013.01)

(58) Field of Classification Search
CPC .. B60W 2540/16; B60W 20/30; B60W 30/19; B60W 2510/1005; B60W 2710/0666; B60K 2006/4825; B60K 6/54; F16H 2037/0873; F16H 3/728; F16H 59/68; Y10T 477/23; Y10T 477/60; Y10T 477/6403
USPC ............ 701/22, 51, 55; 475/150; 477/3, 34, 477/174, 79, 80; 180/65.265, 65.23
See application file for complete search history.

(56) References Cited

U.S. PATENT DOCUMENTS

| | | | |
|---|---|---|---|
| 6,390,949 | B1 | 5/2002 | Kondo et al. |
| 8,131,436 | B2* | 3/2012 | Suzuki ............... F16H 61/061 477/107 |
| 8,255,135 | B2* | 8/2012 | Marcigliano ....... F16H 61/0437 477/77 |
| 2013/0296110 | A1 | 11/2013 | Shelton et al. |

FOREIGN PATENT DOCUMENTS

| | | |
|---|---|---|
| JP | H10-324178 A | 12/1998 |
| JP | 2001-065679 A | 3/2001 |
| JP | 2006-306209 A | 11/2006 |
| JP | 2013-180611 A | 9/2013 |

* cited by examiner

|  | C1 | C2 | C3 | B1 | B2 | F1 |
|---|---|---|---|---|---|---|
| REV |  |  | O |  | O |  |
| D 1st | O |  |  |  | (O) | △ |
| 2nd | O |  |  | O |  |  |
| 3rd | O |  | O |  |  |  |
| 4th | O | O |  |  |  |  |
| 5th |  | O | O |  |  |  |
| 6th |  | O |  | O |  |  |

VEHICLE CONTROL DEVICE

BACKGROUND

The disclosure relates to a vehicle control device for controlling a vehicle driving device including an internal combustion engine as a driving force source for wheels and a transmission apparatus.

In a vehicle including an internal combustion engine and a transmission apparatus, the driver may perform inertial travel of the vehicle by releasing the accelerator before stopping or during traveling on a gentle downhill. When engagement devices of the transmission apparatus are engaged in inertial travel, a resistance force against the travel is generated. For example, continuous travel on a gentle downhill leads to an increase in fuel consumption. Accordingly, in such a case, control may be made to enter a neutral state (state in which power transmission between the internal combustion engine and wheels is released) in which the transmission apparatus does not form transmission shift stages and does not transfer power. When the driver accelerates the vehicle by operating the accelerator, an appropriate transmission shift stage needs to be formed in the transmission apparatus in the neutral state according to the travel speed and torque of the vehicle.

When engagement devices are engaged to form a transmission shift stage in the transmission apparatus, the rotation speed of the rotary member of the engagement devices close to the internal combustion engine desirably matches the rotation speed of the rotary member close to the wheels within a predetermined range. However, when the vehicle travels on a downhill with the transmission apparatus kept in the neutral state and the travel speed of the vehicle increases, the rotation speed of the wheels increases and the rotation speed of the rotary member of the engagement device of the transmission apparatus close to the wheels exceeds the rotation speed of the rotary member close to the internal combustion engine and the difference between these rotation speeds may increase. To form a transmission shift stage in the transmission apparatus by engaging the engagement devices while preventing a negative torque from being transferred to the wheels in this state, the rotation speed of the input shaft of the transmission apparatus needs to be increased by controlling the output torque of the internal combustion engine to increase the rotation speed of the rotary member of the engagement devices close to the internal combustion engine. That is, until the output torque of the internal combustion engine increases, the rotation speed of the input shaft of the transmission apparatus increases, and the rotation speed of the rotary member of the engagement device close to the internal combustion engine becomes higher than the rotation speed of the rotary member close to the wheels, the engagement device cannot be engaged because the engagement of the engagement device transfers a negative torque to the wheels or a positive torque is not transferred to the wheels because one of engagement devices for forming a transmission shift stage is a one-way clutch, thereby causing a response delay in transferring the driving force to the wheels. As a result, the acceleration felt by the driver may degrade.

In recent years, hybrid vehicles provided with an internal combustion engine and a rotary electric machine as driving force sources have come into practical use. Some of such hybrid vehicles drive one of the front and rear wheels using the internal combustion engine and drive the other of the front and rear wheels using the rotary electric machine. In such vehicles, engine travel using the internal combustion engine or EV (Electric Vehicle) travel using the rotary electric machine can be performed by driving only one of the front wheels and the rear wheels or four-wheel drive travel can be performed in hybrid travel that drives both of the front wheels and the rear wheels. JP-A-2013-180611 discloses, as one example of such vehicles, a hybrid vehicle in which front-wheel-drive is performed during engine travel, rear-wheel drive is performed during EV travel, and four-wheel drive is performed during hybrid travel (see FIGS. 1 and. 2, paragraph 0019, and the like).

As a matter of course, such vehicles make a driving system transition, such as a shift from engine travel to hybrid travel or a shift from EV travel to hybrid travel. During EV travel, the transmission apparatus is set in the neutral state. During a shift from EV travel to hybrid travel, an appropriate transmission shift stage needs to be formed in the transmission apparatus according to the travel speed and torque of the vehicle, the same as above. However, when, for example, the torque becomes insufficient during acceleration in EV travel and a shift to hybrid travel is made, the travel speed of the vehicle also increases. Accordingly, also in such hybrid vehicles, the problem the same as above may occur.

SUMMARY

To address the problems described in the background art above, it is desirable to provide a technique for quickly forming a transmission shift stage in the transmission apparatus even when there is an increase in the travel speed of a vehicle traveling in a neutral state in which the transmission apparatus does not form the transmission shift stages and does not transfer power.

According to an exemplary aspect of the disclosure, vehicle control device is a vehicle control device for controlling a vehicle driving device including an internal combustion engine as a driving force source for a wheel and a transmission apparatus, in which the transmission apparatus includes a transmission shift input member drivably coupled to the internal combustion engine, a transmission shift output member drivably coupled to the wheel, and a transmission mechanism having a plurality of engagement devices and selectively forming a plurality of transmission shift stages having different transmission shift ratios depending on engagement states of the plurality of engagement devices, the vehicle control device including a processor that controls the transmission mechanism changing rotation speed of the transmission shift input member at the transmission shift ratios corresponding to the transmission shift stages and transferring the changed rotation speed to the transmission shift output member, when a particular engagement device is engaged to form a particular transmission shift stage in the transmission apparatus from a neutral travel state in which the transmission apparatus does not form the transmission shift stages and does not transfer power during rotation of the wheel, in at least a case in which the engagement devices for forming the transmission shift stages are engaged when a rotation speed of the transmission shift output member increases, a rotation speed of the internal combustion engine is controlled so that a rotation speed of the transmission shift input member becomes higher than a post-transmission-shift input rotation speed, which is the rotation speed of the transmission shift input member after the particular transmission shift stage is formed.

When the rotation speed of the transmission shift output member increases and the post-transmission-shift input rotation speed exceeds the rotation speed of the transmission shift input member in the neutral travel state, control needs to be made so that the rotation speed of the transmission shift input member becomes higher than the post-transmission-shift input rotation speed to form the transmission shift stage while preventing a negative torque from being transferred to wheels. Accordingly, a delay occurs before the transmission shift stage is formed in the transmission apparatus, so quick power transmission may not be performed. However, in this structure, when the engagement devices for forming the transmission shift stage are engaged, the rotation speed of the internal combustion engine is controlled so that the rotation speed of the transmission shift input member becomes higher than the post-transmission-shift input rotation speed. Accordingly, when the driving force of the internal combustion engine needs to be transferred to the wheels, it is possible to quickly transfer the driving force of the internal combustion engine to the wheels by quickly forming the transmission shift stage in the transmission apparatus while preventing a negative torque from being transferred to the wheels. That is, the transmission shift stage can be quickly formed in the transmission apparatus even when there is an increase in the travel speed of a vehicle traveling in a neutral state in which the transmission apparatus does not form the transmission shift stages and does not transfer power.

DETAILED DESCRIPTION OF EMBODIMENTS

Embodiments of the disclosure will be described with reference to the drawings. A vehicle driving device controlled by a vehicle control device according to the disclosure includes at least as an internal combustion engine (engine) as a driving force source for wheels and a transmission apparatus. Here, a preferable embodiment of the disclosure will be described using an example in which a hybrid vehicle having a vehicle driving device further including a rotary electric machine (motor) as a driving force source for wheels.

Figure 1:
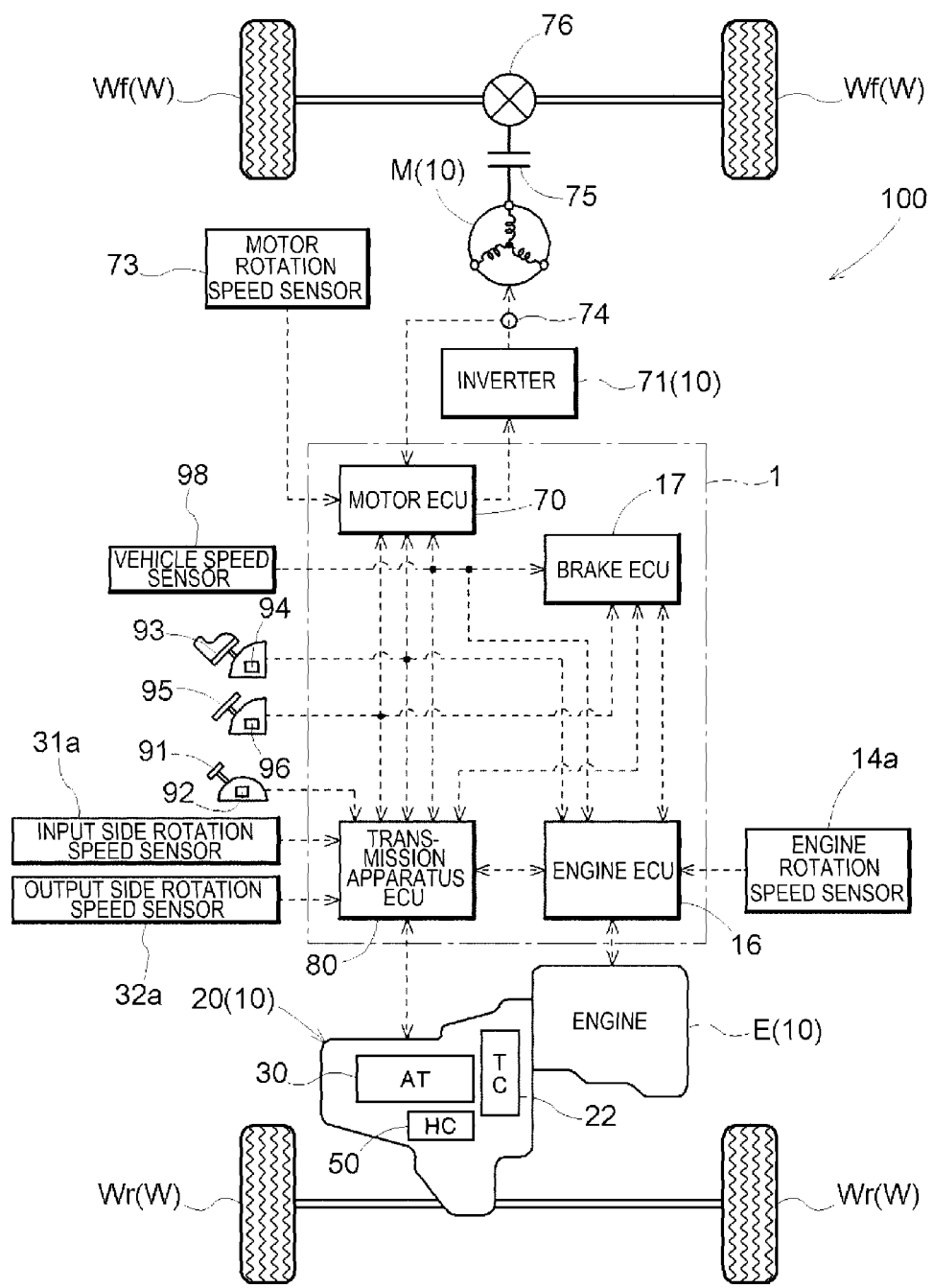
FIG. 1 is a block diagram schematically illustrating an example of the structure of a vehicle driving device and a vehicle control device.

As illustrated in FIG. 1, a vehicle 100 includes a driving device 10 (vehicle driving device) having an engine E (internal combustion engine) as a driving force source for wheels W, a motor M (rotary electric machine) as a driving force source for wheels W, and a transmission apparatus 20. The engine E is an internal combustion engine that outputs power by explosive combustion of hydrogen or carbon hydride fuel such as gasoline, diesel oil, ethanol, or natural gas. The motor M is an AC rotary electric machine, an inverter 71 performs conversion of electric power between DC electric power supplied from a battery (not illustrated) and AC electric power for the motor M. Note that the motor M can also function as an electric generator. In the embodiment, the engine E is used as the driving force source for rear wheels Wr and the motor M is used as the driving force source for front wheels Wf. That is, the vehicle 100 can perform engine travel (rear-wheel drive travel) using the engine E, EV travel (front-wheel drive travel) using the motor M, and hybrid travel (four-wheel drive travel) using the engine E and the motor M. The driving force of the motor M as the driving force source is transferred to the front wheels Wf via a motor engagement device 75 and a motor differential gear device 76 as power transmission systems.

Figure 2:
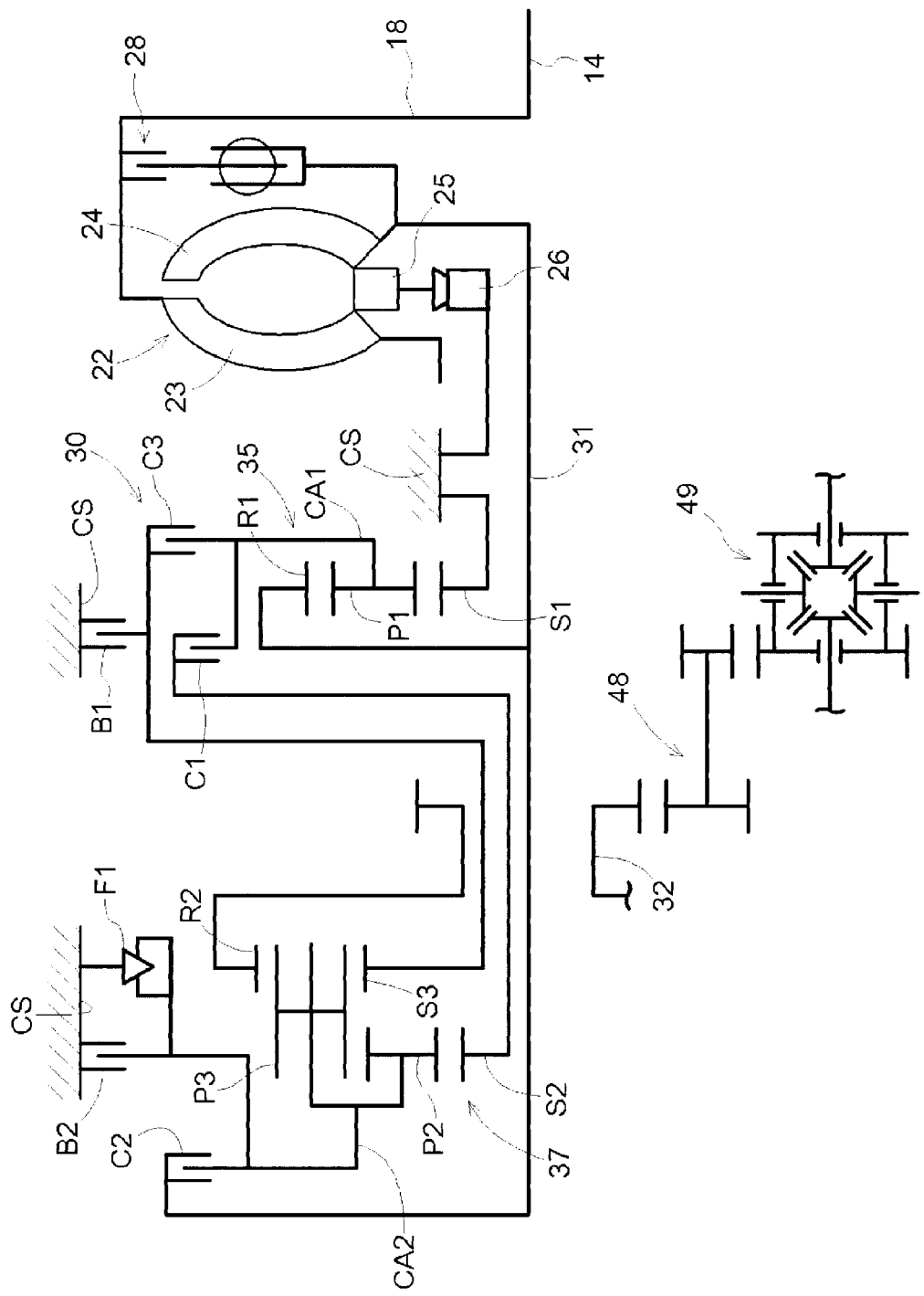
FIG. 2 is a skeleton view illustrating the vehicle driving device.

As illustrated in FIGS. 1 and 2, the transmission apparatus 20 includes the fluid transmission device 22 attached to an output shaft 14 of the engine E, a transmission shift input member 31 drivably coupled to the engine E via the fluid transmission device 22, and a transmission shift output member 32 drivably coupled to the wheels W via a gear mechanism 48 and a differential gear 49 (output differential gear device), the transmission mechanism 30, and a hydraulic circuit 50. The hydraulic circuit 50 supplies working oil to the fluid transmission device 22 and the transmission mechanism 30.

Although described in detail later, the transmission mechanism 30 has a plurality of engagement devices (C1, C2, C3, B1, B2, and F1) and selectively forms a plurality of transmission shift stages having different transmission shift ratios depending on the engagement states of the plurality of engagement devices. The transmission apparatus 20 changes the torque and the rotation speed of the transmission shift input member 31 using transmission shift ratios of the transmission shift stages and transfers the changed torque to the transmission shift output member 32. The torque transferred from the transmission apparatus 20 to the transmission shift output member 32 is distributed and transferred to two left and right axles via a differential gear 49 and then transferred to the wheels W (the rear wheels Wr in this example) drivably coupled to the axles. Here, the transmission shift ratio is the ratio of the rotation speed of the transmission shift input member 31 to the rotation speed of the transmission shift output member 32 when the transmission shift stages are formed in the transmission mechanism 30 (for example, "the rotation speed of the transmission shift input member 31/the rotation speed of the transmission shift output member 32"). In other words, the rotation speed of the transmission shift output member 32 equals "the rotation speed of transmission shift input member 31/the transmission shift ratio". In addition, the torque transferred from the transmission mechanism 30 to the transmission shift output member 32 equals "the torque transferred from the transmission shift input member 31 to the transmission mechanism 30×the transmission shift ratio".

Here, "drivably coupling" indicates the state in which two rotary elements are coupled to each other so as to transfer a driving force (torque) and this state includes the state in which the two rotary elements are coupled to each other so as to be integrally rotatable and the state in which the two rotary elements are coupled to each other via one or more transmission members so as to transfer a driving force. Such transmission members include various types of members that transfer rotation by changing or holding the speed, such as, for example, a shaft, gear mechanism, belt, and chain. In addition, such transmission members may include an engagement device selectively transferring rotation and a driving force, such as, for example, a friction clutch (friction engagement device). Accordingly, in the embodiment, the transmission shift input member 31 is drivably coupled to the engine E via the fluid transmission device 22 and the transmission shift output member 32 is drivably coupled to the wheels W via the differential gear 49.

As illustrated in FIG. 2, the fluid transmission device 22 is configured as a fluid type torque converter with a lock-up clutch. The fluid transmission device 22 includes a pump impeller 23, a turbine runner 24, a stator 25, a one-way clutch 26, and a lock-up clutch 28. The pump impeller 23 as an input-side fluid transmission element is connected to the output shaft 14 (crankshaft) of the engine E via a front cover 18. The turbine runner 24 as an output-side fluid transmission element is connected to the transmission shift input member 31 of the transmission mechanism 30 via a turbine hub. The stator 25 is disposed inside the pump impeller 23 and the turbine runner 24 to adjust a flow of working oil from the turbine runner 24 to the pump impeller 23. The one-way clutch 26 restricts the rotation direction of the stator 25 to one direction. The lock-up clutch 28 achieves a lock-up for coupling the pump impeller 23 (the front cover 18) to the turbine runner 24 (turbine hub) using engagement.

The fluid transmission device 22 functions as a torque amplifier by the action of the stator 25 when the difference in the rotation speed between the pump impeller 23 and the turbine runner 24 is large or functions as a fluid coupling when the difference in the rotation speed between the pump impeller 23 and the turbine runner 24 is small. When the pump impeller 23 and the turbine runner 24 are locked up by the lock-up clutch 28, power from the engine E is mechanically and directly transferred to the transmission shift input member 31. Note that the lock-up clutch 28 is provided with a damper mechanism that absorbs torque fluctuations transferred to the transmission shift input member 31 during a lock-up.

The transmission apparatus 20 (transmission mechanism 30) is configured so that six forward transmission shift stages having different transmission shift ratios and one reverse stage can be selectively formed. As illustrated in FIG. 2, the transmission mechanism 30 in the embodiment includes, as described later, the first planetary gear mechanism 35 of single pinion type having three rotary elements (S1, R1, and CA1), the Ravigneaux type second planetary gear mechanism 37 having four rotary elements (S2, S3, R2, and CA2), the three clutches (C1, C2, and C3), two brakes (B1 and B2), and an one-way clutch F1.

The first planetary gear mechanism 35 includes the sun gear S1 as an external gear, the ring gear R1 as an internal gear disposed concentrically with the sun gear S1, a plurality of pinion gears P1 engaged with the sun gear S1 and the ring gear R1, and a carrier CA1 holding the plurality of pinion gears P1 to enable axial rotation and revolution. The sun gear S1 is fixed to a case CS, which is a non-rotary member. The carrier CA1 is drivably coupled to the second sun gear S3 of the second planetary gear mechanism 37 by a third clutch C3 so as to selectively rotate integrally with the second sun gear S3, drivably coupled to the first sun gear S2 of the second planetary gear mechanism 37 by the first clutch C1 so as to selectively rotate integrally with the first sun gear S2, and selectively fixed to the case CS by a first brake B1. The ring gear R1 is drivably coupled to the transmission shift input member 31 so as to rotate integrally with the transmission shift input member 31.

The second planetary gear mechanism 37 includes two sun gears (S2 and S3) of the external gear, a ring gear R2 of the internal gear, a plurality of short pinion gears P2 engaged with the first sun gear S2, a plurality of long pinion gears P3 engaged with the second sun gear S3 and the plurality of short pinion gears P2 and engaged with the ring gear R2, and the carrier CA2 coupling the plurality of short pinion gears P2 and the plurality of long pinion gears P3 to enable axial rotation and revolution. The first sun gear S2 of the second planetary gear mechanism 37 is drivably coupled to the carrier CA1 of the first planetary gear mechanism 35 by the first clutch C1 so as to selectively rotate integrally with the carrier CA1. The second sun gear S3 is drivably coupled to the carrier CA1 of the first planetary gear mechanism 35 by the third clutch C3 so as to selectively rotate integrally with the carrier CA1 and selectively fixed to the case CS by the first brake B1. The carrier CA2 is drivably coupled to the transmission shift input member 31 by a second clutch C2 so as to selectively rotate integrally with the transmission shift input member 31 and selectively fixed to the case CS as a non-rotary member by a second brake B2 or a one-way clutch F1.

The one-way clutch F1 selectively fixes the carrier CA2 to the case CS by allowing the carrier CA2 to rotate relative to the case CS in a first direction (positive rotation direction in this example), which is one direction, and preventing the carrier CA2 relative to the case CS from rotating in a second direction (negative rotation direction in this example), which is the opposite direction. That is, the one-way clutch F1 is a one-direction engagement device that is put in the release state when the direction of the relative rotation of two members rotating relative to each other is the first direction or put in the engagement state when the direction of the relative rotation is the second direction, which is opposite to the first direction. The ring gear R2 is drivably coupled to the transmission shift output member 32 so as to rotate integrally with the transmission shift output member 32.

In the embodiment, the plurality of engagement devices (C1, C2, C3, B1, and B2) except the one-way clutch F1 included in the transmission apparatus 20 (transmission mechanism 30) are friction engagement devices. These engagement devices include, for example, multi-disc clutches and multi-disc brakes that are operated by hydraulic pressure. The friction engagement device is a power transmission mechanism transferring a torque between engagement members using friction between the engagement members. Here, the maximum torque (transmission torque capacity) that can be transferred by friction of a friction engagement device increases proportionally to the engagement pressure of the friction engagement device. The engagement pressure is a pressure at which an input side engagement member (friction disc) and an output side engagement member (friction disc) are pushed against each other. The engagement pressure (engagement state) is controlled by a hydraulic pressure supplied via the hydraulic circuit 50. Note that the motor engagement device 75 is also a friction engagement device.

In the embodiment, the engagement state (the state in which engagement is present) indicates the state in which the transmission torque capacity is generated in the engagement device and this engagement state includes the state (slip engagement state) in which a difference (slip) in rotation speed is generated between the input side engagement member and the output side engagement member and the state (direct engagement state) in which a difference in rotation speed is not generated between the input side engagement member and the output side engagement member. A non-engagement state (release state) is a state in which the transmission torque capacity is not generated in the engagement device. Note that an indirect engagement state is an engagement state other than the direct engagement state and includes the release state and the slip engagement state.

Figures 3, 4:
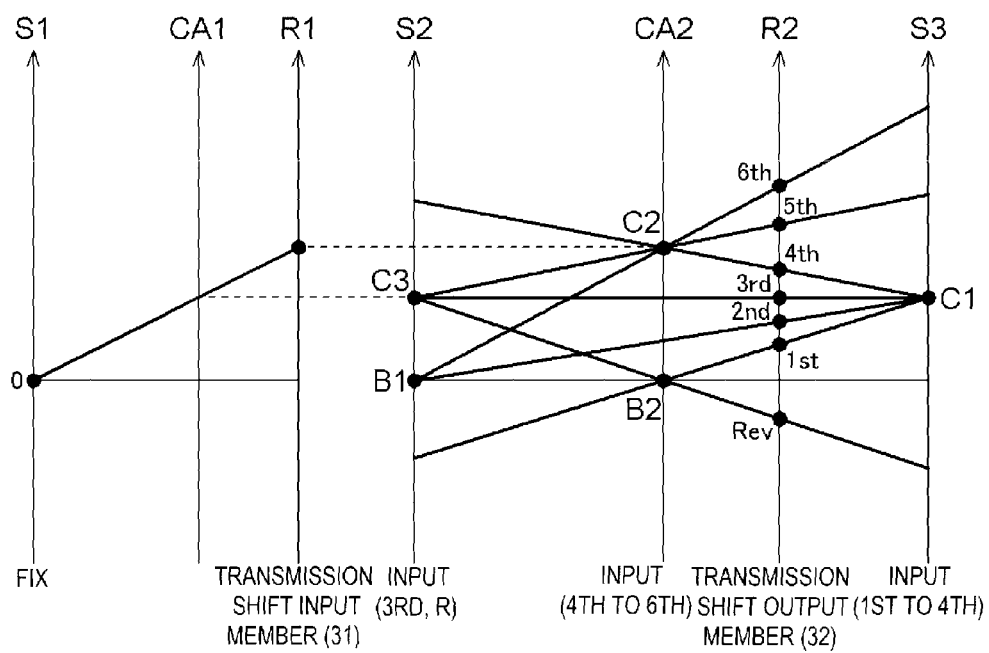
FIG. 3 is an operation table for a transmission apparatus (transmission mechanism).
FIG. 4 is a velocity diagram (collinear figure) illustrating the relationship between the rotation speeds of the rotary elements of the transmission mechanism.

FIG. 3 indicates the relationship between the transmission shift stages of the transmission apparatus 20 (the transmission mechanism 30) and the operation states of the clutches (C1, C2, C3, and F1) and the brakes (B1 and B2). In FIG. 3, a mark "○" indicates that the engagement device is in the engagement state and no mark indicates that the engagement device is in the release state. The mark "○" indicates that the engagement device is put in the engagement stage during use of engine braking or the like. In addition, a mark "Δ" indicates that the engagement device enters the release stage when rotating in one direction or enters the engagement state when rotating in the other direction.

In the transmission mechanism 30, it is possible to perform switching among the first forward stage (first stage: 1st) to the forward sixth forward stage (sixth stage: 6th), a reverse stage (REV), and neutral (N) by combining the engagement or release (non-engagement) of the clutches (C1, C2, C3, and F1) with the engagement or release (non-engagement) of the brakes (B1 and B2), as illustrated in the operation table in FIG. 3. Note that neutral is the state in which the transmission mechanism 30 does not form any of the transmission shift stages (the first to sixth stages and the reverse stage) and does not transfer power (this state may be referred to below as a "neutral state" as appropriate). These forward transmission shift stages include the first stage (1st), the second stage (2nd), the third stage (3rd), the fourth stage (4th), the fifth stage (5th), and the sixth stage (6th) in the descending order of the transmission shift ratio (reduction ratio). FIG. 4 illustrates the relationship of the rotation speeds between the rotary elements included in the transmission mechanism 30.

As illustrated in FIG. 1, the driving device 10 is drive-controlled by a control device 1 (vehicle control device). The control device 1 for controlling the driving device 10 includes an engine ECU (Electronic Control Unit) 16, a brake ECU 17, a motor ECU 70, a transmission apparatus ECU 80, and the like. The ECUs have logic processors such as microprocessors as cores and achieve their functions in cooperation between hardware including peripheral circuits (such as memories) and software such as programs executed by the processors.

The engine ECU 16 controls the engine E based on detection results from a vehicle speed sensor 98, an engine rotation speed sensor 14a, an accelerator pedal position sensor 94, and the like. The vehicle speed sensor 98 detects the travel speed (vehicle speed) of the vehicle 100 based on, for example, the rotation of the wheels W. The engine rotation speed sensor 14a is attached to the output shaft 14 of the engine E and detects the operational state of the engine E, such as the engine rotation speed. The accelerator pedal position sensor 94 detects the amount of operation of an accelerator pedal 93 and the engine ECU 16 performs calculation based on the accelerator opening converted from the amount of operation. The engine ECU 16 controls the engine E by outputting a driving signal to a throttle motor (not illustrated) driving a throttle valve (not illustrated), a control signal to a fuel injection valve (not illustrated), an ignition signal to an ignition plug (not illustrated), and the like. The engine ECU 16 can drive-control the engine E using at least two control methods including torque control for controlling the engine E to output a target torque and rotation speed control for controlling the engine E to rotate at a target rotation speed. Normally, the engine ECU 16 drive-controls the engine E using the torque control method.

The brake ECU 17 controls a brake, not illustrated, (for example, an electronic control hydraulic brake) based on the detection results from the vehicle speed sensor 98, a brake pedal position sensor 96, and the like. The brake pedal position sensor 96 detects the amount of operation of a brake pedal 95 and the brake ECU 17 performs calculation based on the amount of braking converted from the amount of operation. The motor ECU 70 controls the motor M via the inverter 71 based on detection results from the vehicle speed sensor 98, the accelerator pedal position sensor 94, the brake pedal position sensor 96, a motor rotation speed sensor 73 such as a resolver, a current sensor 74 detecting electric current flowing through the stator coil of the motor M, and the like.

The transmission apparatus ECU 80 controls the transmission apparatus 20 based on detection results from the vehicle speed sensor 98, the accelerator pedal position sensor 94, the brake pedal position sensor 96, a shift position sensor 92 detecting the operation position of a shift lever 91, an input side rotation speed sensor 31a detecting the rotation of the input side of the transmission apparatus 20 such as the transmission shift input member 31, an output side rotation speed sensor 32a detecting the rotation of the output side of the transmission apparatus 20 such as the transmission shift output member 32, and the like. As illustrated in FIGS. 1 and 2, the transmission apparatus ECU 80 controls the fluid transmission device 22 and the transmission mechanism 30 by controlling the hydraulic circuit 50.

The control device 1 further includes an integrated control function. The integrated control function integrates various types of control performed on the engine E, the motor M, the transmission apparatus 20, the motor engagement device 75, and the like as the entire vehicle. The control device 1 may include an integrated control ECU, not illustrated, in addition to the engine ECU 16, the brake ECU 17, the motor ECU 70, the transmission apparatus ECU 80, and the like or the control device 1 may be included in the integrated control ECU and the engine ECU 16, the brake ECU 17, the motor ECU 70, the transmission apparatus ECU 80, and the like may be included in the integrated control ECU. In any case, the control device 1 has a processor performing integrated control processing and achieves the integrated control function in cooperation between hardware such as the processor and software such as programs executed by the processor.

The control device 1 calculates the torque (vehicle requested torque Trq) requested to drive the wheels W according to the accelerator opening, the vehicle speed, the charge amount of battery, and the like and determines the travel modes that use the engine E and the motor M. As described above, the travel modes include the EV travel mode using only the motor M as the driving force source, the engine travel mode using the engine E, and the hybrid travel mode using the motor M and the engine E. For example, when the charge amount of the battery is sufficient during start of the vehicle 100, the EV travel mode is selected. After the start using the EV travel mode, when the accelerator opening is large or the torque becomes insufficient, a shift from the EV travel mode to the hybrid travel mode is made.

During EV travel, the transmission apparatus 20 enters the neutral state in which no transmission shift stages are formed and power is not transferred. During a shift from EV travel to hybrid travel, a transmission shift stage appropriate for the travel speed and torque of the vehicle 100 needs to be formed in the transmission apparatus 20 in the neutral state. However, when, for example, the torque becomes insufficient during acceleration in EV travel and a shift to hybrid travel is made, the travel speed of the vehicle 100 also increases. Even in such a case, the transmission shift stage needs to be formed in the transmission apparatus 20 by quickly engaging the engagement devices (C1, C2, C3, B1, B2, and F1).

Figure 5:
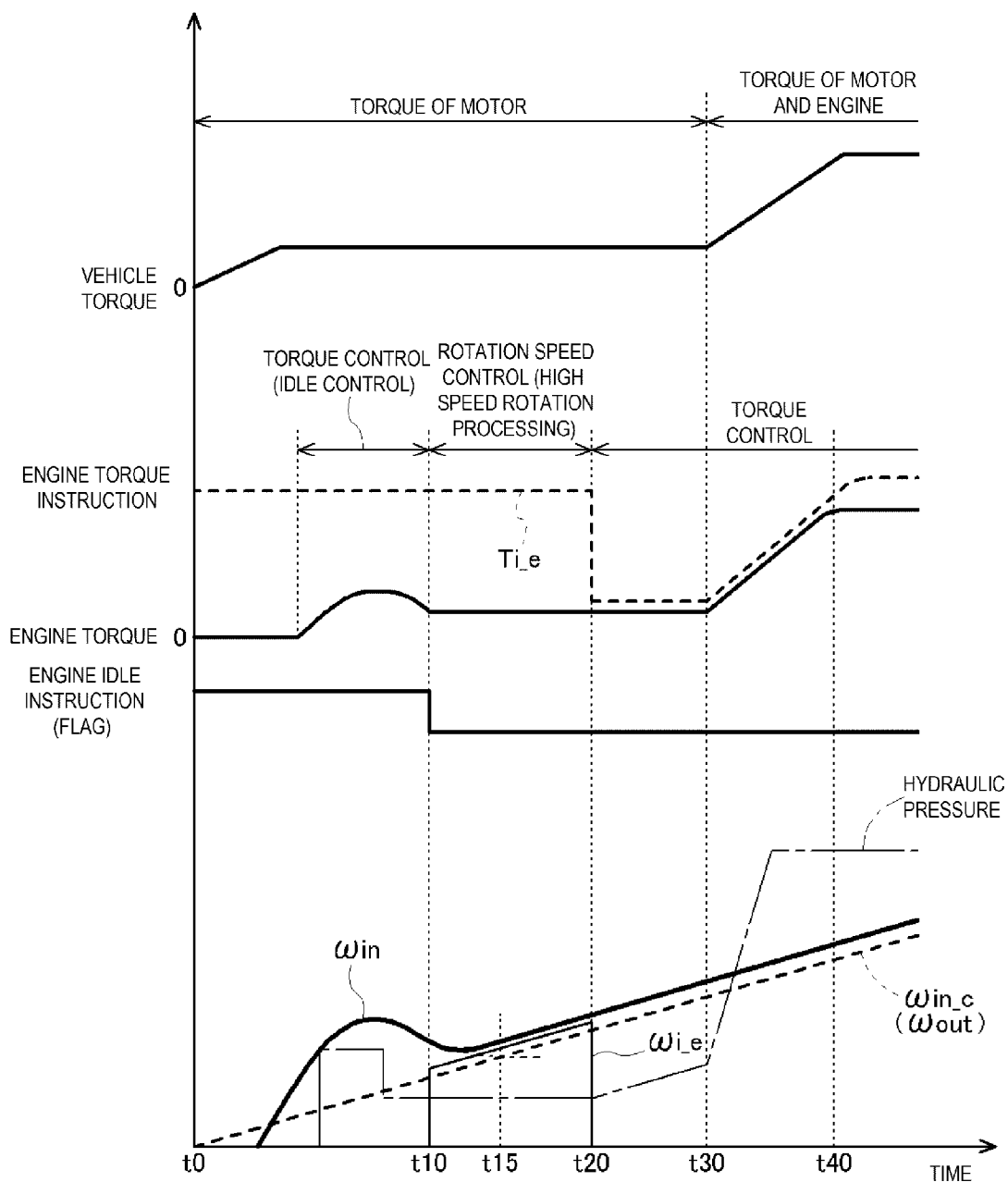
FIG. 5 is a timing chart illustrating an example of timing at which high speed rotation processing is performed.

In the embodiment, as illustrated in the timing chart in FIG. 5, the control device 1 controls the rotation speed of the engine E at least when (approximately at time t30) the engagement devices for forming the transmission shift stage is engaged so that the rotation speed (transmission shift input shaft rotation speed win) of the transmission shift input member 31 becomes higher than a post-transmission-shift input rotation speed ωin_c, which will be described later. This control is made using rotation number control. Although described in detail below, the internal combustion engine E first undergoes torque control and then undergoes rotation speed control from time t10, as illustrated in FIG. 5. In the rotation speed control beginning at time t10, the rotation speed of the engine E is controlled so that the rotation speed (transmission shift input shaft rotation speed win) of the transmission shift input member 31 becomes higher than the post-transmission-shift input rotation speed ωin_c and this control is referred to below as "high speed rotation processing". High speed rotation processing is performed until (approximately until time t30) engagement of the engagement devices for forming the transmission shift stage so that the transmission shift input shaft rotation speed win becomes higher than the post-transmission-shift input rotation speed ωin_c.

Note that the post-transmission-shift input rotation speed ωin_c is the rotation speed of the transmission shift input member 31 after the particular transmission shift stage is formed. In other words, the post-transmission-shift input rotation speed ωin_c is obtained by converting the rotation speed (transmission shift output shaft rotation speed ωout0) of the transmission shift output member 32 to the rotation speed at the position of the transmission shift input member 31. Accordingly, the post-transmission-shift input rotation speed ωin_c is the speed (ωout) corresponding to the output side (the transmission shift output member 32 and the wheels W). In the embodiment, the post-transmission-shift input rotation speed ωin_c can be obtained by converting the rotation speed (transmission shift output shaft rotation speed ωout0) of the transmission shift output member 32 based on the transmission shift ratio. For example, preferably, the post-transmission-shift input rotation speed ωin_c is obtained by multiplying the rotation speed (transmission shift output shaft rotation speed ωout0) of the transmission shift output member 32 by the transmission shift ratio of the power transmission path from the transmission shift output member 32 to the transmission shift input member 31.

Note that the transmission shift ratio is defined by the transmission shift stage determined based on a transmission shift map, not illustrated, including the requested torque of the engine E and the speed of the vehicle 100. The transmission shift ratio referenced to calculate the post-transmission-shift input rotation speed ωin_c is preferably the transmission shift ratio determined during issuance of a transmission shift stage formation instruction. That is, the post-transmission-shift input rotation speed ωin_c is preferably the rotation speed obtained by converting the transmission shift output shaft rotation speed ωout0 based on the transmission shift ratio determined with reference to the transmission shift map according to the requested torque of the engine E and the speed of the vehicle 100 during issuance of a transmission shift stage formation instruction. The transmission shift ratio may be constantly determined in advance according to the requested torque of the engine E and the speed of the vehicle 100, so that the latest transmission shift ratio can be used during issuance of a transmission shift stage formation instruction. When, for example, a shift from EV travel to hybrid travel is made, the control device 1 starts the stopped engine E and then forms the transmission shift stage. In such a case, the post-transmission-shift input rotation speed ωin_c is preferably calculated based on the transmission shift ratio determined during issuance of an engine start instruction.

In the embodiment, in the state in which the rotation speed (corresponding to the "post-transmission-shift input rotation speed ωin_c" in FIG. 5) of the transmission shift output member 32 increases, the transmission shift stage is formed in the transmission apparatus 20 from the neutral travel state. The neutral travel state is a travel state in which the wheels W are rotating (the vehicle 100 is traveling) and is also a neutral state in which the transmission apparatus 20 does not form transmission shift stages and does not transfer power. A feature of the embodiment according to the disclosure resides in that the rotation speed of the engine E is controlled so that the transmission shift input shaft rotation speed win becomes higher than the post-transmission-shift input rotation speed ωin_c in such a state.

Figure 6:
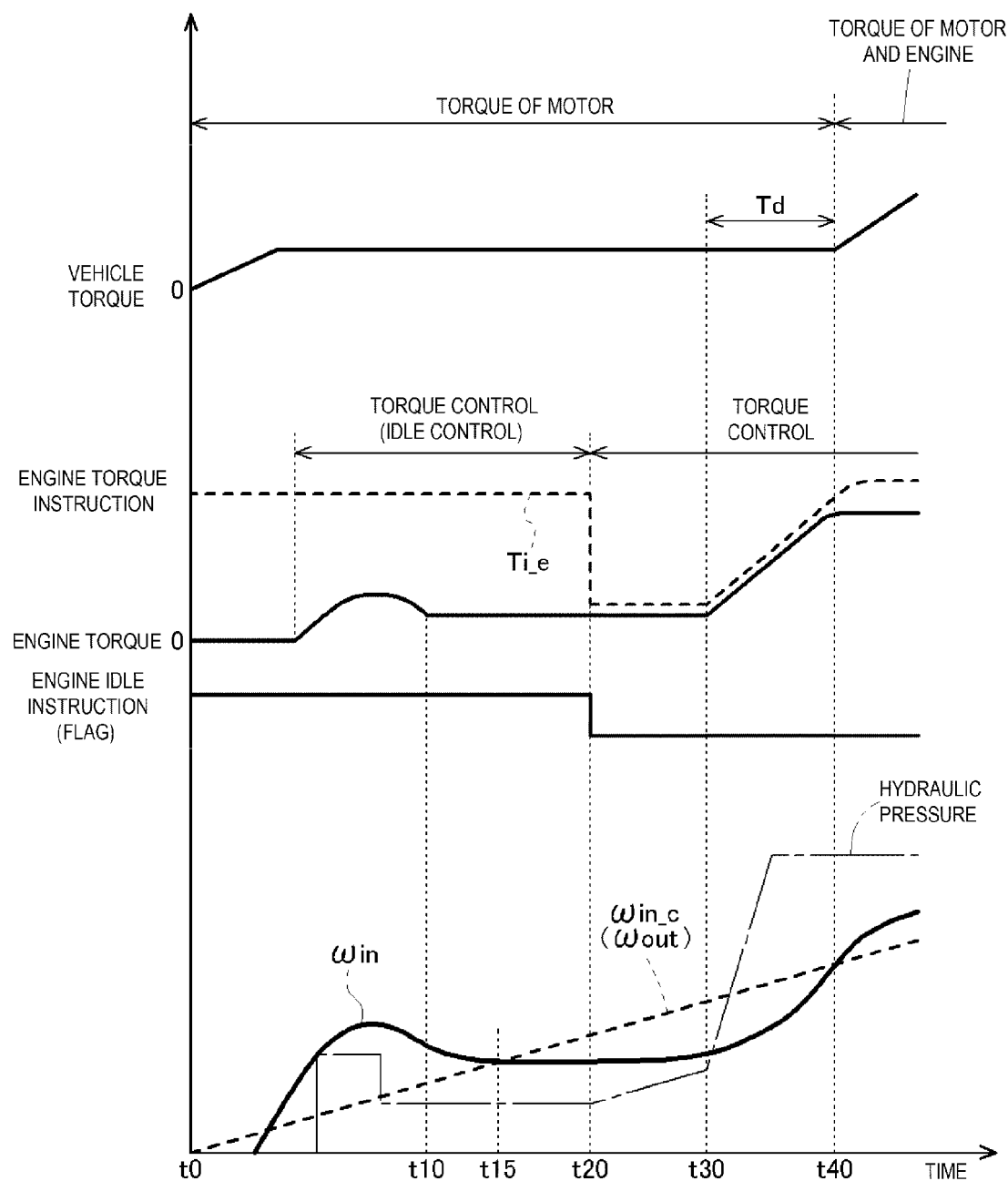
FIG. 6 is a timing chart illustrating an example (comparison example) in which high speed rotation processing is not performed.

When the engagement devices (C1, C2, C3, B1, B2, and F1) are engaged to form the transmission shift stage in the transmission apparatus 20, the rotation speed (transmission shift input shaft rotation speed win) of the rotary member (the transmission shift input member 31) of the engagement devices close to the engine E is preferably equal to or higher than the post-transmission-shift input rotation speed ωin_c (the rotary speed obtained by converting the rotation speed of the rotary member (the transmission shift output member 32) close to the wheels W to the rotation speed in the position of the transmission shift input member 31, the rotation speed obtained by converting the rotation speed of the transmission shift output member 32 based on the transmission shift ratio, the rotation speed of the transmission shift input member 31 after the particular transmission shift stage is formed). However, when the travel speed of the vehicle 100 increases and the rotation speed of the transmission shift output member 32 drivably coupled to the wheels W increases, the post-transmission-shift input rotation speed ωin_c may exceed the transmission shift input shaft rotation speed win at the timing at which the engagement devices need to be engaged. As illustrated in FIG. 5, the control device 1 controls the rotation speed of the engine E (performs high speed rotation processing) as described in detail below so that the post-transmission-shift input rotation speed ωin_c does not exceed the transmission shift input shaft rotation speed win in such a situation. FIG. 6 illustrates an example in which high speed rotation processing is not performed in such a situation and the post-transmission-shift input rotation speed ωin_c exceeds the transmission shift input shaft rotation speed win at the timing at which the engagement devices need to be engaged. High speed rotation processing will be described with reference to the comparison example in FIG. 6. The embodiment uses an example in which the engine E is started immediately after the vehicle 100 drives off and the first stage (1st) is formed in the transmission apparatus 20.

The vehicle 100 travels at time t0 using the torque of the motor M as a driving force. The engine E having been stopped is started between time t0 and time t10. Although the engine ECU 16 can drive-control the engine E using the two control methods as described above, the engine ECU 16 normally drive-controls the engine E using torque control.

Accordingly, the engine E having been started is drive-controlled using torque control. At this time, the transmission shift stage is not formed in the transmission apparatus 20 and the engine E is drive-controlled so as to enter an idle state (idle control). Idle control may be performed by providing an appropriate engine torque instruction or may be performed based on an idle flag output when the transmission apparatus 20 is controlled so as to enter the neutral state, in cooperation with the transmission apparatus ECU 80 or the like.

At time t20, the control device 1 starts control for forming the transmission shift stage in the transmission apparatus 20. The control device 1 performs torque reduction processing for temporarily reducing the output torque of the engine E to relieve an engagement shock caused when the engagement devices are engaged. As illustrated in FIGS. 5 and 6, an engine torque instruction Ti_e is reduced in the period from time t20 to time t30 and the engine torque instruction Ti_e is returned to the value before torque reduction in the period from time t30 to time t40. In the comparison example illustrated in FIG. 6, in starting the torque reduction processing, an engine idle instruction (flag) is put in a disabled state. When high speed rotation processing is performed as illustrated in FIG. 5, in starting high speed rotation processing, the engine idle instruction (flag) is put in a disabled state.

During torque reduction processing (from time t20 to time t40), the transmission apparatus ECU 80 applies the hydraulic pressure to the engagement devices via the hydraulic circuit 50 to form the transmission shift stage in the transmission apparatus 20. As illustrated in the example in FIG. 5, when the first stage (1st) is formed as the transmission shift stage, the brake B2 and the one-way clutch F1 as the engagement devices are engaged to form the transmission shift stage (see FIGS. 3 and 4). That is, the brake B2 is supplied with the hydraulic pressure and engaged, a positive torque from the engine E is transferred to the wheels W side, and the one-way clutch F1 is also engaged. When high speed rotation processing is being performed, the transmission shift input shaft rotation speed ωin is higher than the post-transmission-shift input rotation speed ωin_c at time t30. Accordingly, the one-way clutch F1 is engaged immediately after the brake B2 is engaged, the transmission shift stage is formed in the transmission apparatus 20, and the engine torque is transferred to the wheels W. That is, hybrid travel is achieved. The vehicle torque to be transferred to the wheels W is the torque of the motor M before time t30 and the combined value of the torque of the motor M and the torque of the engine E at time t30 and later.

In contrast, in the comparison example illustrated in FIG. 6, the travel speed of the vehicle 100 increases (the post-transmission-shift input rotation speed ωin_c increases) while the engine E is in the idle operation state. Accordingly, between time t10 and time t20, the transmission shift input shaft rotation speed ωin is smaller than the post-transmission-shift input rotation speed ωin_c. Accordingly, even when the hydraulic pressure is applied to the engagement devices via the hydraulic circuit 50 to form the transmission shift stage in the transmission apparatus 20, the transmission shift stage is not immediately formed. As described above, when the first stage (1st) is formed as the transmission shift stage, the brake B2 and the one-way clutch F1 as the engagement devices are engaged to form the transmission shift stage (see FIGS. 3 and 4). However, in the comparison example, since the transmission shift input shaft rotation speed ωin is smaller than the post-transmission-shift input rotation speed ωin_c even when the brake B2 is supplied with the hydraulic pressure and engaged, the one-way clutch F1 is not engaged and the transmission shift stage is not formed. After that, when the rotation speed of the engine E increases as the engine torque instruction Ti_e increases and the transmission shift input shaft rotation speed ωin exceeds the post-transmission-shift input rotation speed ωin_c, the one-way clutch F1 is engaged to form the transmission shift stage in the transmission apparatus 20 (time t40). At this time, the vehicle torque to be transferred to the wheels W is the sum of the torque of the motor M and the torque of the engine E. As is clear from comparison between FIG. 5 and FIG. 6, in the comparison example (FIG. 6) in which high speed rotation processing is not performed, a delay "Td" is caused before the vehicle torque increases, unlike the case in which high speed rotation processing is performed. In other words, execution of high speed rotation processing suppresses the delay "Td".

High speed rotation processing is achieved by rotation speed control, which is a control method making control so that the engine E rotates at a target rotation speed. In execution of high speed rotation processing, the control device 1 (the engine ECU 16) changes the control method for the engine E from torque control to rotation speed control. As illustrated in FIG. 5, the engine E undergoes rotation speed control between time t10 and time t20 based on an engine rotation number instruction ωi_e instead of the engine torque instruction Ti_e.

After the rotation speed (transmission shift input shaft rotation speed ωin) of the transmission shift input member 31 becomes higher than the post-transmission-shift input rotation speed ωin_c, the control device 1 controls the rotation speed of the engine E so that the rotation speed of the transmission shift input member 31 does not become lower than the post-transmission-shift input rotation speed ωin_c. When the fluid electric motor device 22 is put in the lock-up state by the lock-up clutch 28, the engine E is directly connected to the transmission shift input member 31 and the transmission shift input shaft rotation speed ωin matches the rotation speed of the engine E. Accordingly, in the lock-up state, after the rotation speed of the engine E becomes higher than the post-transmission-shift input rotation speed ωin_c, the control device 1 controls the rotation speed of the engine E so as not to become lower than the post-transmission-shift input rotation speed ωin_c. In one aspect, after the transmission shift input shaft rotation speed ωin (or the rotation speed of the engine E) becomes higher than the post-transmission-shift input rotation speed ωin_c, the control device 1 controls the rotation speed of the engine E so that the transmission shift input shaft rotation speed ωin becomes higher than the post-transmission-shift input rotation speed ωin_c before the transmission shift input shaft rotation speed ωin (or the rotation speed of the engine E) matches the post-transmission-shift input rotation speed ωin_c. In this case, preferably, the control device 1 controls the rotation speed of the engine E so that the transmission shift input shaft rotation speed ωin (or the rotation speed of the engine E) is constantly higher than the post-transmission-shift input rotation speed ωin_c after the transmission shift input shaft rotation speed ωin (or the rotation speed of the engine E) becomes higher than the post-transmission-shift input rotation speed ωin_c.

Specifically, the control device 1 starts high speed rotation processing before the rotation speed (transmission shift input shaft rotation speed ωin) of the transmission shift input member 31 becomes lower than the post-transmission-shift input rotation speed ωin_c because of an increase in the rotation speed of the transmission shift output member 32.

For example, high speed rotation processing is started by time t15 illustrated in FIGS. 5 and 6. Preferably, in starting execution of high speed rotation processing, the control device 1 performs rotation speed determination processing that determines whether the rotation speed (transmission shift input shaft rotation speed ωin) of the transmission shift input member 31 is lower than the post-transmission-shift input rotation speed ωin_c.

In the rotation speed determination processing, the control device 1 preferably determines whether the rotation speed (transmission shift input shaft rotation speed ωin) of the transmission shift input member 31 is lower than the post-transmission-shift input rotation speed ωin_c based on a temporal change in an input synchronization rotation speed ωin_s, which is the rotation speed of the transmission shift input member 31 or a member rotating in sync with the transmission shift input member 31, and a temporal change in an output synchronization rotation speed ωout_s, which is the rotation speed of the transmission shift output member 32 or a member rotating in sync with the transmission shift output member 32. For example, when (1) it is determined that the input synchronization rotation speed ωin_s has changed slightly based on a temporal change in the input synchronization rotation speed ωin_s, (2) it is determined that the output synchronization rotation speed ωout_s has increased based on a temporal change in the output synchronization rotation speed ωout_s, and (3) the difference between the rotation speeds (or the difference between the transmission shift input shaft rotation speed ωin and the post-transmission-shift input rotation speed ωin_c) when the input synchronization rotation speed ωin_s and the output synchronization rotation speed ωout_s during the determination are converted to rotation speeds in one of reference rotary members in the power transmission path is less than a predetermined rotation speed difference, then the control device 1 can determine that the transmission shift input shaft rotation speed ωin may become lower than the post-transmission-shift input rotation speed ωin_c. In one aspect of rotation speed determination processing, the control device 1 may determine whether the transmission shift input shaft rotation speed ωin may become lower than the post-transmission-shift input rotation speed ωin_c based on the change ratio of the output synchronization rotation speed ωout_s and the change ratio of the input synchronization rotation speed ωin_s.

In the embodiment, the rotation speed of the transmission shift input member 31 detected by the input side rotation speed sensor 31a is assumed to be the input synchronization rotation speed ωin_s and the rotation speed of the transmission shift output member 32 detected by the output side rotation speed sensor 32a is assumed to be the output synchronization rotation speed ωout_s. However, the input synchronization rotation speed ωin_s may be the rotation speed of the member (the member coupled by bypassing the engagement element, that is, the member rotating constantly at a rotation speed proportional to the rotation speed of the transmission shift input member 31) rotating in sync with the transmission shift input member 31. Similarly, the output synchronization rotation speed ωout_s may be the rotation speed of the member rotating in sync with the transmission shift output member 32.

In addition, in rotation speed determination processing, the control device 1 may perform reverse time estimation processing for estimating the time (reverse time equivalent to time t15) at which the transmission shift input shaft rotation speed ωin becomes lower than the post-transmission-shift input rotation speed ωin_c based on a temporal change in the output synchronization rotation speed ωout_s and a temporal change in the input synchronization rotation speed ωin_s. In one aspect, preferably, the control device 1 estimates the reverse time (time t15) based on the change ratio of the output synchronization rotation speed ωout_s and the change ratio of the input synchronization rotation speed ωin_s.

For example, the control device 1 calculates a change ratio "a" of the output synchronization rotation speed ωout_s based on a temporal change in the output synchronization rotation speed ωout_s detected by the output side rotation speed sensor 32a. Since the change ratio of the changes ratio of the output synchronization rotation speed ωout_s is equivalent to the acceleration of the vehicle 100, for example, the control device 1 may use the acceleration "a" of the vehicle 100 detected by an acceleration sensor, not illustrated, as the change ratio "a" of the output synchronization rotation speed ωout_s. In addition, the control device 1 calculates a change ratio "d" of the input synchronization rotation speed ωin_s based on a temporal change in the input synchronization rotation speed ωin_s detected by the input side rotation speed sensor 31a. At this time, the control device 1 may obtain the change ratio (the acceleration of the engine E) of the input synchronization rotation speed ωin_s in cooperation with the engine ECU 16.

As a matter of course, when the calculation capability of the processor included in the control device 1 is sufficient, it is possible to directly calculate the intersection point (time t15) of the characteristic curve of the transmission shift input shaft rotation speed ωin (or the input synchronization rotation speed ωin_s) and the characteristic curve of the post-transmission-shift input rotation speed ωin_c (or the output synchronization rotation speed ωout_s). That is, the control device 1 may calculate the intersection point by formulating the expressions of functions representing both characteristic curves.

When the rotation speed (transmission shift input shaft rotation speed ωin) of the transmission shift input member 31 is determined to be lower than the post-transmission-shift input rotation speed ωin_c, the control device 1 controls the rotation speed of the engine E so that the rotation speed (ωin) of the transmission shift input member becomes higher than the post-transmission-shift input rotation speed ωin_c, which is the rotation speed of the transmission shift input member 31 of a particular transmission shift stage. In other words, when the rotation speed (ωin) of the transmission shift input member 31 is determined to be lower than the post-transmission-shift input rotation speed ωin_c in the above rotation speed determination processing, the control device 1 performs high speed rotation processing. High speed rotation processing is preferably performed at a time (for example, at time t10) before the reverse time (for example, time t15) so that the transmission shift input shaft rotation speed ωin does not become lower than the post-transmission-shift input rotation speed ωin_c. For example, when the reverse time is estimated, high speed rotation processing is preferably performed at a time that is a predetermined margin response time before the reverse time. The margin response time (Tm) is, for example, "t15–t10". When the reverse time is not estimated, high speed rotation processing is preferably started immediately after the transmission shift input shaft rotation speed ωin has been determined to be possibly lower than the post-transmission-shift input rotation speed ωin_c.

As described above, in the structure according to the embodiment, by controlling the rotation speed of the engine E so that the rotation speed (transmission shift input shaft rotation speed ωin) of the transmission shift input member 31 becomes higher than the post-transmission-shift input rotation speed ωin_c, it is possible to maintain the condition under which the transmission shift stage can be quickly formed in the transmission apparatus 20. This enables the transmission shift stage to be quickly formed in the transmission apparatus 20 even when the travel speed of the vehicle 100 in the neutral travel state increases.

Other Embodiments

Other embodiments of the disclosure will be described below. Incidentally, the configurations of respective embodiments described below are not limited to those respectively applied alone, but as long as no conflict arises, can be applied in combination with the configuration of other embodiments.

(1) In the above description, the driving device 10 further includes the motor M in addition to the engine E. However, the driving device 10 does not need to include the motor M. For example, when the vehicle 100 travels on a gentle downhill, the driver may perform inertial travel of the vehicle by releasing the accelerator. When the transmission shift stage is formed in the transmission apparatus 20 during inertial travel, a so-called engine braking state is entered to rotate the engine E so as to follow the rotation of the wheels W and a torque for reducing the speed of the vehicle 100 acts on the wheels W. In such a case, to increase the distance of inertial travel and reduce the fuel consumption of the vehicle 100, the transmission apparatus 20 may be put in the neutral state. To accelerate the vehicle 100 via the driver's accelerator operation from such a neutral state, it is necessary to form an appropriate transmission shift stage according to the travel speed and torque of the vehicle 100 in the transmission apparatus 20 in the neutral state. Accordingly, even in the vehicle 100 without the motor M, torque reduction processing as described above is preferably performed.

(2) In the above description, the driving device 10 further includes the motor M in addition to the engine E, the engine E is drivably coupled to the rear wheels Wr via the transmission apparatus 20, and the motor M is drivably coupled to the front wheels Wf (the other wheels). However, the engine E may be drivably coupled to the front wheels Wf via the transmission apparatus 20 and the motor M may be drivably coupled to the rear wheels Wr (the other wheels). In addition, the disclosure is not limited to the structure in which the motor M is drivably coupled to wheels (Wf or Wr) different from the wheels (Wf or Wr) to which the engine E is drivably coupled via the transmission apparatus 20 as described above and the engine E and the motor M may be drivably coupled to the same wheels W. However, to drive the wheels W by the driving force of the motor M with the transmission apparatus 20 put in the neutral state, preferably, the motor M is drivably coupled to the rotary member included in the power transmission path between the transmission shift output member 32 and the wheels W. That is, the neutral travel state is a neutral state in which the transmission apparatus 20 does not form any transmission shift stages and is desirably achieved while the torque of the motor M is transferred to any of the wheels W.

(3) As a specific example of the post-transmission-shift input rotation speed ωin_c, the above description uses an example in which the rotation speed (transmission shift output shaft rotation speed ωout0) of the transmission shift output member 32 is multiplied by the transmission shift ratio of the power transmission path from the transmission shift output member 32 to the transmission shift input member 31. However, the post-transmission-shift input rotation speed ωin_c may be based on any rotation speed as long as the post-transmission-shift input rotation speed ωin_c is converted from the rotation speed of a member rotating in sync with the transmission shift output member 32. In any case, it is preferable to perform conversion in consideration of the transmission shift ratio of the power transmission path between the detection position (the transmission shift input member 31) of the transmission shift input shaft rotation speed ωin and the detection position of the rotation speed of the member from which the conversion is performed. Note that the member rotating in sync is a member coupled by bypassing the engagement element and the rotation speed is proportional to the rotation speed of the rotary member (the transmission shift output member 32 in this example) with which this member rotates in sync.

(4) In the above description, one of engagement devices used to form the transmission shift stage in the transmission apparatus 20 is a one-direction engagement device (the one-way clutch F1). However, the disclosure is not limited to this example and the engagement device used to form the transmission shift stage may not include a one-direction engagement device and may be a friction engagement device or a meshing engagement device. When the transmission shift stage is formed in such engagement devices, if the transmission shift stage is formed in the state in which the transmission shift input shaft rotation speed ωin of the transmission shift input member 31 is lower than the post-transmission-shift input rotation speed ωin_c, a negative torque is transferred to the wheels W. To prevent this, the engagement timing of at least a part of engagement devices for forming transmission shift stages needs to be shifted to a point after control of the rotation speed of the engine E so that the transmission shift input shaft rotation speed ωin becomes higher than the post-transmission-shift input rotation speed ωin_c and the driving force of the engine E cannot be quickly transferred to the wheels. However, if high speed rotation processing is performed as described above, such delay can be suppressed and the driving force of the engine E can be quickly transferred to the wheels. That is, the structure of the disclosure is also effective when the engagement device for forming the transmission shift stage is configured by one or both of a friction engagement device and a meshing engagement device.

Outline of Embodiments of the Disclosure

The outline of a vehicle control device (1) according to the embodiments of the disclosure as described above will be described in brief.

In the characteristic structure of the vehicle control device (1) according to the embodiment of the disclosure, the vehicle control device (1) controls a vehicle driving device (10) including an internal combustion engine (E) as a driving force source for a wheel (W) and a transmission apparatus (20), in which the transmission apparatus (20) includes a transmission shift input member (31) drivably coupled to the internal combustion engine (E), a transmission shift output member (32) drivably coupled to the wheel (W), and a transmission mechanism (30) having a plurality of engagement devices (C1, C2, C3, B1, B2, and F1) and selectively forming a plurality of transmission shift stages having different transmission shift ratios depending on engagement states of the plurality of engagement devices (C1, C2, C3, B1, B2, and F1), the transmission mechanism (30) changing rotation speed of the transmission shift input member at the transmission shift ratios corresponding to the transmission shift stages and transferring the changed rotation speed to the transmission shift output member, when a particular engagement device is engaged to form a particular transmission shift stage in the transmission apparatus (20) from a neutral travel state in which the transmission apparatus (20) does not form the transmission shift stages and does not transfer power during rotation of the wheel (W), in at least a case in which the engagement devices (C1, C2, C3, B1, B2, and F1) for forming the transmission shift stages are engaged when a rotation speed of the transmission shift output member (32) increases, a rotation speed of the internal combustion engine (E) is controlled so that a rotation speed ($\omega$in) of the transmission shift input member (31) becomes higher than a post-transmission-shift input rotation speed ($\omega$in_c), which is the rotation speed of the transmission shift input member (31) after the particular transmission shift stage is formed.

When the rotation speed of the transmission shift output member (32) increases in the neutral travel state and the post-transmission-shift input rotation speed ($\omega$in_c) exceeds the rotation speed ($\omega$in) of the transmission shift input member (31), control needs to be made so that the rotation speed of the transmission shift input member (31) becomes higher than the post-transmission-shift input rotation speed ($\omega$in_c) to form the transmission shift stages while preventing a negative torque from being transferred to the wheels W. Accordingly, a delay occurs before the transmission shift stages are formed in the transmission apparatus (20), so quick power transmission may not be performed. However, in this structure, when the engagement devices (C1, C2, C3, B1, B2, and F1) for forming the transmission shift stages are engaged, the rotation speed of the internal combustion engine (E) is controlled so that the rotation speed ($\omega$in) of the transmission shift input member (31) becomes higher than the post-transmission-shift input rotation speed. Accordingly, when the driving force of the internal combustion engine (E) needs to be transferred to the wheel (W), it is possible to quickly transfer the driving force of the internal combustion engine (E) to the wheel (W) by quickly forming the transmission shift stage in the transmission apparatus (20) while preventing a negative torque from being transferred to the wheel (W). That is, the transmission shift stages can be quickly formed in the transmission apparatus (20) even when there is an increase in the travel speed of a vehicle (100) traveling in a neutral state in which the transmission apparatus (20) does not form the transmission shift stages and does not transfer power.

In one aspect, the vehicle control device according to the disclosure desirably control the rotation speed of the internal combustion engine (E) to prevent the rotation speed of the transmission shift input member (31) from becoming lower than the post-transmission-shift input rotation speed ($\omega$in_c) after the rotation speed of the transmission shift input member (31) becomes higher than the post-transmission-shift input rotation speed ($\omega$in_c). In this structure, even when the rotation speed ($\omega$out0) of the transmission shift output member (32) increases, the rotation speed of the internal combustion engine (E) is controlled so that the rotation speed of the transmission shift input member (31) constantly becomes higher than the post-transmission-shift input rotation speed ($\omega$in_c). Accordingly, quick power transmission is achieved at any time during acceleration of the vehicle (100).

When the rotation speed ($\omega$in) of the input member (31) is kept higher than the post-transmission-shift input rotation speed ($\omega$in_c) until the engagement devices (C1, C2, C3, B1, B2, and F1) for forming the transmission shift stages are engaged, quick power transmission is achieved even if the engagement devices (C1, C2, C3, B1, B2, and F1) are engaged at any time. The rotation speed of the internal combustion engine (E) is substantially constant since an idling state is entered when the power of the internal combustion engine (E) is not transferred to the wheels (W). When the post-transmission-shift input rotation speed ($\omega$in_c) becomes higher than the rotation speed ($\omega$in) of the transmission shift input member (31) in this idling state, in the case in which the engagement devices (C1, C2, C3, B1, B2, and F1) are engaged later, quick power transmission is prevented. Accordingly, when the post-transmission-shift input rotation speed ($\omega$in_c) increases, it is preferable to determine whether the post-transmission-shift input rotation speed ($\omega$in_c) exceeds the rotation speed of the internal combustion engine (E) and quickly control the rotation speed of the internal combustion engine (E). In one aspect, preferably, the vehicle control device (1) determines whether the rotation speed ($\omega$in) of the transmission shift input member (31) is lower than the post-transmission-shift input rotation speed ($\omega$in_c) based on a temporal change in an input synchronization rotation speed ($\omega$in_s), which is a rotation speed of the transmission shift input member (31) or a member rotating in sync with the transmission shift input member (31), and a temporal change in an output synchronization rotation speed ($\omega$out_s), which is a rotation speed of the transmission shift output member (32) or a member rotating in sync with the transmission shift output member (32), and, when the rotation speed ($\omega$in) of the transmission shift input member (31) is determined to be lower than the post-transmission-shift input rotation speed ($\omega$in_c), the rotation speed of the internal combustion engine (E) is controlled so that the rotation speed ($\omega$in) of the transmission shift input member (31) becomes higher than the post-transmission-shift input rotation speed ($\omega$in_c), which is the rotation speed of the transmission shift input member (31) after the particular transmission shift stage is formed.

Although the internal combustion engine (E) is generally drive-controlled using a control method, that is, torque control, using the output torque of the internal combustion engine (E) as the target torque, the internal combustion engine (E) may be drive-controlled using a method other than torque control. For example, the internal combustion engine (E) may be controlled using a control method (that is, rotation speed control) outputting the target rotation speed. After starting the internal combustion engine (E) and starting the control of the internal combustion engine (E), the control method is not changed generally. However, the rotation speed of the internal combustion engine (E) needs to be controlled to make the rotation speed ($\omega$in) of the transmission shift input member (31) higher than the post-transmission-shift input rotation speed ($\omega$in_c). Accordingly, the vehicle control device (1) is desirably configured so that the control method can be changed. In one aspect, preferably, the internal combustion engine (E) can be drive-controlled using at least two control methods including torque control for making control so as to output a target torque and rotation speed control for making control so as to rotate at a target rotation speed and the control method of the internal combustion engine (E) is changed from the torque control to the rotation speed control in controlling the rotation speed of the internal combustion engine (E) so that the rotation speed ($\omega$in) of the transmission shift input member (31) becomes higher than the post-transmission-shift input rotation speed ($\omega$in_c).

As described above, the vehicle control device (1) controls the vehicle driving device (10) including at least the internal combustion engine (E) and the transmission apparatus (20). In recent years, hybrid vehicles provided with the internal combustion engine (E) and the rotary electric machine (M) as driving force sources have come into practical use. In such a vehicle, engine travel using the internal combustion engine (E) and the transmission apparatus (20), EV travel using the rotary electric machine (M), and hybrid travel using the internal combustion engine (E) and the rotary electric machine (M) are enabled. Since the transmission apparatus (20) is generally in the neutral state during EV travel, during a transition from EV travel to hybrid travel, it is desirable to form an appropriate transmission shift stage according to the travel speed and torque of the vehicle (100) in the transmission apparatus (20) as described above. However, when the torque becomes insufficient during acceleration in EV travel and a shift to hybrid travel is made, the travel speed of the vehicle (100) may also increase. Accordingly, also in such hybrid vehicle, there is a strong need for a technique that quickly forms appropriate transmission shift stages according to the travel speed and torque of the vehicle (100) in the transmission apparatus (20) in the neutral state.

That is, in a preferable aspect, preferably, the vehicle driving device (10) to be controlled by the vehicle control device (1) further includes the rotary electric machine (M), the rotary electric machine (M) is drivably coupled as described below, and the neutral travel state is achieved as described below. Specifically, preferably, the rotary electric machine (M) is drivably coupled to the wheel (Wf) different from the wheel (Wr) to which the internal combustion engine (E) is drivably coupled via the transmission apparatus (20), and the neutral travel state is a neutral state in which the transmission apparatus (20) does not form the transmission shift stages and does not transfer power and is achieved while the torque of the rotary electric machine (M) is transferred to the other wheel (Wf). Alternatively, preferably, the rotary electric machine (M) is drivably coupled to the rotary member included in the power transmission path between the transmission shift output member (32) and the wheel (W) and the neutral travel state is a neutral state in which the transmission apparatus (20) does not form the transmission shift stages and does not transfer power and is achieved while the torque of the rotary electric machine (M) is transferred to the wheel (W).

INDUSTRIAL APPLICABILITY

The disclosure is applicable to a vehicle control device for controlling a vehicle driving device including an internal combustion engine as a driving force source for wheels and a transmission apparatus.

The invention claimed is:

1. A vehicle control device for controlling a vehicle driving device including an internal combustion engine as a driving force source for a wheel and a transmission apparatus,
wherein the transmission apparatus includes a transmission shift input member drivably coupled to the internal combustion engine, a transmission shift output member drivably coupled to the wheel, and a transmission mechanism having a plurality of engagement devices and selectively forming a plurality of transmission shift stages having different transmission shift ratios depending on engagement states of the plurality of engagement devices, the vehicle control device comprising:
a processor that controls the transmission mechanism changing rotation speed of the transmission shift input member at the transmission shift ratios corresponding to the transmission shift stages and transferring the changed rotation speed to the transmission shift output member,
wherein when a particular engagement device is engaged to form a particular transmission shift stage in the transmission apparatus from a neutral travel state in which the transmission apparatus does not form the transmission shift stages and does not transfer power during rotation of the wheel, in at least a case in which the engagement devices for forming the transmission shift stages are engaged when a rotation speed of the transmission shift output member increases, a rotation speed of the internal combustion engine is controlled so that a rotation speed of the transmission shift input member becomes higher than a post-transmission-shift input rotation speed, which is the rotation speed of the transmission shift input member after the particular transmission shift stage is formed.

2. The vehicle control device according to claim 1,
wherein the rotation speed of the internal combustion engine is controlled to prevent the rotation speed of the transmission shift input member from becoming lower than the post-transmission-shift input rotation speed after the rotation speed of the transmission shift input member becomes higher than the post-transmission-shift input rotation speed.

3. The vehicle control device according to claim 2,
wherein a determination is made as to whether the rotation speed of the transmission shift input member is lower than the post-transmission-shift input rotation speed based on a temporal change in an input synchronization rotation speed, which is the rotation speed of the transmission shift input member or a member rotating in sync with the transmission shift input member, and a temporal change in an output synchronization rotation speed, which is the rotation speed of the transmission shift output member or a member rotating in sync with the transmission shift output member, and
when the rotation speed of the transmission shift input member is determined to be lower than the post-transmission-shift input rotation speed, the rotation speed of the internal combustion engine is controlled so that the rotation speed of the transmission shift input member becomes higher than the post-transmission-shift input rotation speed, which is the rotation speed of the transmission shift input member after the particular transmission shift stage is formed.

4. The vehicle control device according to claim 3,
wherein the internal combustion engine is drive-controllable using at least two control methods including torque control for making control so as to output a target torque and rotation speed control for making control so as to rotate at a target rotation speed, and
the control method of the internal combustion engine is changed from the torque control to the rotation speed control in controlling the rotation speed of the internal combustion engine so that the rotation speed of the transmission shift input member becomes higher than the post-transmission-shift input rotation speed.

5. The vehicle control device according to claim 4,
wherein the vehicle driving device further includes a rotary electric machine, and
the rotary electric machine is drivably coupled to another wheel other than the wheel to which the internal combustion engine is drivably coupled via the transmission apparatus, the neutral travel state is a neutral state in which the transmission apparatus does not form the transmission shift stages and does not transfer power and is achieved while a torque of the rotary electric machine is transferred to the other wheel, or
the rotary electric machine is drivably coupled to a rotary member included in a power transmission path between the transmission shift output member and the wheel and the neutral travel state is a neutral state in which the transmission apparatus does not form the transmission shift stages and does not transfer power and is achieved while a torque of the rotary electric machine is transferred to the wheel.

6. The vehicle control device according to claim 3,
wherein the vehicle driving device further includes a rotary electric machine, and
the rotary electric machine is drivably coupled to another wheel other than the wheel to which the internal combustion engine is drivably coupled via the transmission apparatus, the neutral travel state is a neutral state in which the transmission apparatus does not form the transmission shift stages and does not transfer power and is achieved while a torque of the rotary electric machine is transferred to the other wheel, or
the rotary electric machine is drivably coupled to a rotary member included in a power transmission path between the transmission shift output member and the wheel and the neutral travel state is a neutral state in which the transmission apparatus does not form the transmission shift stages and does not transfer power and is achieved while a torque of the rotary electric machine is transferred to the wheel.

7. The vehicle control device according to claim 2,
wherein the internal combustion engine is drive-controllable using at least two control methods including torque control for making control so as to output a target torque and rotation speed control for making control so as to rotate at a target rotation speed, and
the control method of the internal combustion engine is changed from the torque control to the rotation speed control in controlling the rotation speed of the internal combustion engine so that the rotation speed of the transmission shift input member becomes higher than the post-transmission-shift input rotation speed.

8. The vehicle control device according to claim 2,
wherein the vehicle driving device further includes a rotary electric machine, and
the rotary electric machine is drivably coupled to another wheel other than the wheel to which the internal combustion engine is drivably coupled via the transmission apparatus, the neutral travel state is a neutral state in which the transmission apparatus does not form the transmission shift stages and does not transfer power and is achieved while a torque of the rotary electric machine is transferred to the other wheel, or
the rotary electric machine is drivably coupled to a rotary member included in a power transmission path between the transmission shift output member and the wheel and the neutral travel state is a neutral state in which the transmission apparatus does not form the transmission shift stages and does not transfer power and is achieved while a torque of the rotary electric machine is transferred to the wheel.

9. The vehicle control device according to claim 1,
wherein a determination is made as to whether the rotation speed of the transmission shift input member is lower than the post-transmission-shift input rotation speed based on a temporal change in an input synchronization rotation speed, which is the rotation speed of the transmission shift input member or a member rotating in sync with the transmission shift input member, and a temporal change in an output synchronization rotation speed, which is the rotation speed of the transmission shift output member or a member rotating in sync with the transmission shift output member, and
when the rotation speed of the transmission shift input member is determined to be lower than the post-transmission-shift input rotation speed, the rotation speed of the internal combustion engine is controlled so that the rotation speed of the transmission shift input member becomes higher than the post-transmission-shift input rotation speed, which is the rotation speed of the transmission shift input member after the particular transmission shift stage is formed.

10. The vehicle control device according to claim 1,
wherein the internal combustion engine is drive-controllable using at least two control methods including torque control for making control so as to output a target torque and rotation speed control for making control so as to rotate at a target rotation speed, and
the control method of the internal combustion engine is changed from the torque control to the rotation speed control in controlling the rotation speed of the internal combustion engine so that the rotation speed of the transmission shift input member becomes higher than the post-transmission-shift input rotation speed.

11. The vehicle control device according to claim 1,
wherein the vehicle driving device further includes a rotary electric machine, and
the rotary electric machine is drivably coupled to another wheel other than the wheel to which the internal combustion engine is drivably coupled via the transmission apparatus, the neutral travel state is a neutral state in which the transmission apparatus does not form the transmission shift stages and does not transfer power and is achieved while a torque of the rotary electric machine is transferred to the other wheel or
the rotary electric machine is drivably coupled to a rotary member included in a power transmission path between the transmission shift output member and the wheel and the neutral travel state is a neutral state in which the transmission apparatus does not form the transmission shift stages and does not transfer power and is achieved while a torque of the rotary electric machine is transferred to the wheel.

\* \* \* \* \*